(12) United States Patent
Heo (10) Patent No.: US 9,164,974 B2
(45) Date of Patent: Oct. 20, 2015

(54) METHOD AND APPARATUS FOR PROVIDING AN ELECTRONIC BOOK SERVICE IN A MOBILE DEVICE

(75) Inventor: Dong Kyu Heo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 394 days.

(21) Appl. No.: 13/305,073

(22) Filed: Nov. 28, 2011

(65) Prior Publication Data

US 2012/0137247 A1   May 31, 2012

(30) Foreign Application Priority Data

Nov. 26, 2010   (KR) ........................ 10-2010-0118609

(51) Int. Cl.
*G06F 3/14* (2006.01)
*G06F 17/24* (2006.01)

(52) U.S. Cl.
CPC .................................. *G06F 17/241* (2013.01)

(58) Field of Classification Search
CPC .................................. G06F 3/14; G06F 3/17
USPC .......... 715/200–277, 700–867; 700/701–866; 709/201–229; 705/50–79; 345/30–111, 345/173
See application file for complete search history.

(56) References Cited

U.S. PATENT DOCUMENTS

| 6,230,169 | B1 | 5/2001 | Nagae |
| 7,318,193 | B2 | 1/2008 | Kim et al. |
| 7,506,246 | B2 | 3/2009 | Hollander et al. |
| 2004/0075652 | A1* | 4/2004 | Kang et al. ..................... 345/173 |
| 2004/0088332 | A1 | 5/2004 | Lee et al. |
| 2004/0139400 | A1 | 7/2004 | Allam et al. |
| 2007/0208994 | A1 | 9/2007 | Reddel et al. |
| 2008/0222542 | A1 | 9/2008 | Woolf et al. |
| 2009/0217152 | A1* | 8/2009 | Wake ............................ 715/234 |
| 2011/0055329 | A1* | 3/2011 | Abt et al. ...................... 709/205 |
| 2012/0036429 | A1* | 2/2012 | Ajima .......................... 715/259 |

FOREIGN PATENT DOCUMENTS

| CN | 1354427 A | 6/2002 |
| CN | 101063971 A | 10/2007 |
| CN | 101765840 A | 6/2010 |
| JP | 10-240220 A | 9/1998 |
| JP | 2001-52026 A | 2/2001 |
| JP | 2004-159210 A | 6/2004 |
| JP | 2004-206658 A | 7/2004 |

(Continued)

OTHER PUBLICATIONS

Katashi Nagao, "Digital Content Annotation and Transcoding", Mar. 1, 2003, pp. 80-91, Artech House Inc. Norwood. MA.

(Continued)

*Primary Examiner* — Ruay Ho
(74) *Attorney, Agent, or Firm* — Jefferson IP Law, LLP (57) ABSTRACT

A method and a mobile device of providing an electronic book (e-book) service are provided. The method can independently create processed data, without altering the original contents, and share it with other mobile devices. The method includes displaying original contents, overlaying and displaying processed data according to a user's input on the original contents, and mapping the processed data to the original contents, and independently storing them, according to a user's selection.

18 Claims, 9 Drawing Sheets

(56) References Cited

FOREIGN PATENT DOCUMENTS

| JP | 4377098 B2 | 9/2009 |
|---|---|---|
| WO | 01/29709 A1 | 4/2001 |
| WO | 2005/101233 A1 | 10/2005 |
| WO | 2008/031625 A2 | 3/2008 |

OTHER PUBLICATIONS

Scott McLeod, "Tools for school—Digital document annotation on an iPad. iPod Touch. or laptop", Jun. 15, 2010.
Scott Stein, "Do Kindles (and other e-readers) need better ways to annotate?", Sep. 30, 2009.
Jonas Wisser, "An In-Depth Look at Kindle for iPad and iPhone", May 17, 2010.
Wikipedia "Annotea", Sep. 29, 2010.
Masaru Miyamoto, An e-book Service Supporting Collaboration Task with Memos on the Internet, 59th National Conference Lecture Dissertation Collection (4) Interface Computer and Human Society, Sep. 28, 1999, pp. 4-123 to 4-124, Information Processing Society of Japan, Japan.
Portable Document Format, Wikipedia, The Free Encyclopedia, Revision of Nov. 24, 2010, pp. 1-23.
Amazon Kindle, Wikipedia, The Free Encyclopedia, Revision of Nov. 25, 2010, pp. 1-15.

* cited by examiner

1. As requested in [ ] letter of March 22, we would be happy to accept the payment in U.S. dollars.
   (A) yours    (B) you    (C) your    (D) yourself 2. The travel agency will notify you when the tickets become [ ] for delivery.
   (A) ready    (B) readier    (C) readily    (D) readiness 3. If the executive director is dissatisfied with your business proposal, you should [ ].
   (A) either    (B) neither    (C) both    (D) however 4. A newspaper [ ] us in touch with the world.
   (A) keeping    (B) to keep    (C) keeps    (D) keep 5. Scientists have concluded [ ] rainfall and general weather conditions.
   (A) that what sunspots affect
   (B) what affects sunspots
   (C) what affects sunspots
   (D) that sunspots affect 6. The quality of education from elementary school through college has become [ ] in recent years.
   (A) subject to especially interesting
   (B) a subject of special interest
   (C) such an interesting subject that special
   (D) a subject that especially interests

210

230

JOONGYEOK IN KOREAN

VERB+SINGULAR NUMBER

A    B

THE USE OF 'THAT' IS 'OBJECT' AND, IN THAT CASE, THAT-CLAUSE INCLUDES SUBJECT+ VERB

✱ ONE CONJUCTION HAS TWO VERBS, SO ONE VERB MUST BE DELETED
VERB X

METHOD AND APPARATUS FOR PROVIDING AN ELECTRONIC BOOK SERVICE IN A MOBILE DEVICE

PRIORITY

This application claims the benefit under 35 U.S.C. §119(a) of a Korean patent application filed on Nov. 26, 2010 in the Korean Intellectual Property Office and assigned Serial No. 10-2010-0118609, the entire disclosure of which is hereby incorporated by reference.

BACKGROUND OF THE INVENTION

1. Field of the Invention

The present invention relates to system and method for providing electronic book services in a mobile device. More particularly, the present invention relates to an apparatus and method that does not alter the original contents according to an e-book service, creates independently processed data according to a user's operation, and shares it with other mobile devices.

2. Description of the Related Art

With the rapid development of information and communication technology and semiconductor technology, the use of various types of mobile devices has also increased. The mobile devices utilize mobile convergence to provide additional service functions provided by other types of mobile systems, as well as their traditional service functions. For example, a mobile communication device can include additional functions as well as its usual communication functions such as a voice call, and message transmission and reception. Examples of the additional functions are a TV viewing function (e.g., mobile broadcasting, such as Digital Multimedia Broadcasting (DMB), Digital Video Broadcasting (DVB), etc.), an audio playback function (e.g., MPEG Audio Layer 3 (MP3)), a photographing function, an Internet access function, a dictionary browsing, etc.

Conventional mobile devices are developing that support an electronic book (e-book) function. The users buy e-book contents and store them in their mobile devices. Electronic books (e-books) refer to a general term representing digital books that contain information such as text, images, etc. and are stored in electronic media, which can be used as paper books. Electronic books are created from digital data that is converted from contents in paper books or publications. Electronic books are stored in electronic media. Users can view the contents in an e-book, via computers or mobile devices, via wired or wireless communication.

More particularly, tablet personal computers or tablet PCs are developed that have a relatively large display, allowing users to easily view contents therethrough. This encourages the development of technology related to an e-book function. The e-book function provides user convenience when displaying contents of an e-book.

SUMMARY OF THE INVENTION

Aspects of the present invention are to address at least the above-mentioned problems and/or disadvantages and to provide at least the advantages described below. Accordingly, an aspect of the present invention is to provide a mobile device that can support an electronic book (e-book) service, and a method for operating an e-book function in the mobile device.

Another aspect of the present invention is to provide a method that does not alter the original contents of an e-book during the e-book service and allows a user to input processed data. The invention further provides a mobile device adapted to the method.

Another aspect of the present invention is to provide a method that can create processed contents by combining the original contents according to an e-book service with processed data created as the user applies inputs to the original contents. The invention further provides a mobile device adapted to the method.

Another aspect of the present invention is to provide a method that can separately store only processed data from processed contents and share the stored, processed data with other mobile devices. The invention further provides a mobile device adapted to the method.

Another aspect of the present invention is to provide a method and apparatus that can enhance the user convenience of a mobile device, by achieving an environment in the mobile device where an e-book service is provided.

In accordance with an aspect of the present invention, a method for providing an e-book service in a mobile device is provided. The method includes displaying original contents, overlaying and displaying processed data according to a user's input on the original contents, mapping the processed data to the original contents, and independently storing the processed data and the original contents, according to a user's selection.

In accordance with another aspect of the present invention, a method for providing an e-book service in a mobile device is provided. The method includes displaying original contents, loading processed data corresponding to the original contents and overlaying and displaying the processed data on the original contents, adding processed data input by a user to the processed data, mapping processed data including the additional processed data to the original contents, and independently storing the processed data and the original contents.

In an exemplary implementation, the method may be implemented with programs that can be executed by a processor, which are stored in a computer-readable recording media.

In accordance with another aspect of the present invention, a mobile device supporting an e-book service is provided. The device includes a display unit, a storage unit, and a controller. The display unit displays original contents according to the e-book service, and overlays and displays processed data corresponding to a user's input or selection on the original contents. The storage unit stores the original contents for the e-book service, processed data created corresponding to the original contents, and processed data transmitted from an external system. The controller configures, when detecting an edit mode request during the display of the original contents, an overlay window. The controller controls the display unit to display the processed data on the original contents via the overlay window. The controller controls the storage unit to store the processed data as an independent object with respect to the original contents.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The invention relates to a method that allows users to create independent, individual electronic-book (e-book) contents from the original e-book contents, without altering the original e-book contents, when using an e-book service. The invention also relates to a mobile device adapted to the method. The method and the mobile device adapted thereto can also allow users to share their e-book contents with each other and create integral e-book contents.

In the following description, the term 'original e-book contents' is called 'original contents' and refers to a general term 'digital books' that have been or can be published as paper books. The term 'individual e-book contents' and 'integral e-book contents' is called 'processed data.' More particularly, the 'individual e-book contents' refer to processed data that is an independent object separately created from the original contents according to a user's inputs. The 'Integral e-book contents' refer to processed data created as a number of users process the individual e-book contents. For example, the integral e-book contents are the processed data that is created in such a manner that, when a first user creates first processed data, a second user applies addition of new processed data to the first processed data, alteration or deletion to the first processed data. The term 'processed contents' refers to 'contents' that are created as the processed data is added to the original contents in an overlay window format according to a user's settings.

In the following description, the configuration and operation of a mobile device will be explained in detail referring to the drawings. It should be understood that the invention is not limited to the following exemplary embodiments. It will be noted that there may be many modifications from the exemplary embodiments.

Figure 1:
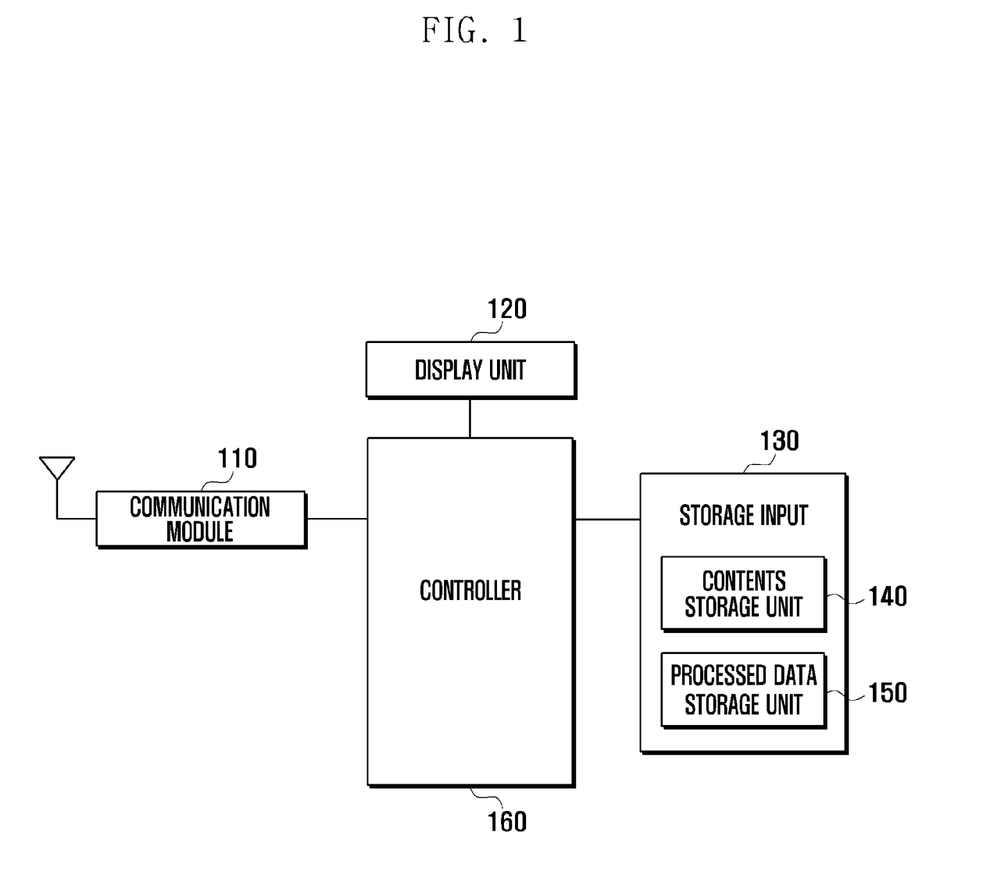
FIG. 1 illustrates a schematic block diagram of a mobile device according to an exemplary embodiment of the present invention.

FIG. 1 illustrates a schematic block diagram of a mobile device according to an exemplary embodiment of the present invention.

Referring to FIG. 1, the mobile device includes a communication module 110, a display unit 120, a storage unit 130, and a controller 160. Although it is not shown in the drawings, it will be noted that the mobile device may further include: an audio processing unit with a microphone and a speaker; a digital broadcast module for receiving and playing back mobile broadcasting (e.g., Digital Multimedia Broadcasting (DMB), Digital Video Broadcasting (DVB), etc.); a camera module for photographing pictures/video; a Bluetooth communication module; an Internet module; a touchpad; a key input unit; a battery; etc. Since these elements are well-known to an ordinary person skilled in the art, the detailed description is omitted in the following description.

The communication module 110 supports a mobile communication service and a Wireless Local Area Network (WLAN) based Internet service (e.g., Wi-Fi service). The communication module 110 establishes a communication channel with network systems and communicates data via the channel. More particularly, the communication module 110 can transmit/receive processed data via a mobile communication service or Internet service.

The display unit 120 displays various types of screens when applications are executed in the mobile device as well as a home screen for the mobile device. The applications related to various functions, for example, messages, emails, Internet, multimedia, browsing, communication, e-book, photographing, videos, playing back photographs/video, TV viewing (e.g., mobile broadcasting such as DMB, DVB, etc.), audio playback (e.g., MP3 files), widget, note, gaming, etc. The display unit 110 may be implemented with a Liquid Crystal Display (LCD), an Organic Light Emitting Diode (OLED), an Active Matrix Organic Light Emitting Diodes (AMOLED), or the like. The display unit 120 can provide an overlay window to receive processed data, according to a user's request, when the e-book function is executed. That is, when the e-book function is executed, the display unit 120 displays original contents, and also processed data on the original contents via the overlay window. The display unit 120 can display processed contents by combining the original contents with the processed data. Alternatively, the display unit 120 can independently display only processed data according to a user's selection. The display unit 120 can also display an execution screen (according to the execution of the e-book function) in a landscape mode or a portrait mode according to the rotation direction of the mobile device.

In an exemplary embodiment of the invention, the display unit 120 may include an interface that supports a touch-based input function. For example, when the display unit 120 is implemented with a touch screen, it receives a user's touch input, creates an input signal corresponding thereto, and transfers it to the controller 160. Although the exemplary embodiment is implemented to include only one display unit, it should be understood that the invention is not limited thereto. The exemplary embodiment may be modified in such a manner that the mobile device includes two or more display units.

The storage unit 130 stores data and programs executed in the mobile device. The storage unit 130 is comprised of at least one or more volatile memory devices and non-volatile memory devices. Examples of the non-volatile memory devices are Read Only Memory (ROM), flash memory, etc. The volatile memory device includes Random Access Memory (RAM), etc. The storage unit 130 may permanently or temporarily store an Operating System (OS) of the mobile device, data and programs related to the display control of the display unit 120, data and programs related to the input control via the display unit 120, data and programs related to the operation of an e-book function, etc.

In an exemplary embodiment of the invention, the storage unit 130 includes a contents storage unit 140 and a processed data storage unit 150.

The contents storage unit 140 stores original contents, i.e., original e-book contents. The processed data storage unit 150 stores processed data, i.e., individual e-book contents and integral e-book contents. The storage unit 130 stores processed contents created by combining the original contents with the processed data. The processed contents can be stored in a particular area of the storage unit 130 or in the contents storage unit 140. The processed data stored in the processed data storage unit 150 may be data created in the mobile device or data received from the external device.

In an exemplary embodiment of the invention, the processed data may be stored by being combined with various types of information, for example, meta information, processing information, etc. The meta information serves to identify original contents cooperating processed data corresponding to a user's input. The processing information includes a location (or coordinate) where processed data is mapped in the original contents, a processing format, a font size, etc.

The controller 160 controls operations of the mobile device. More particularly, the controller 160 can control the operations related to an e-book function. For example, when the e-book function is executed, the controller 160 extracts the original contents according to a user's selection and displays it on the display unit 120. The controller 160 provides an overlay window on the original contents, and displays process data corresponding to a user's input on the overlay window. When processed data is stored, the controller 160 can store only the processed data based on the overlay window, as an independent object, while maintaining the original contents. In this process, the controller 160 can store the processed data mapping to the original contents. The controller 160 can also control the transmission/reception operation via wired/wireless communication with the other mobile devices in order to share the processed data. The operations and control method of the mobile device will be described below with the description regarding the control operation of the controller 160.

The controller 160 can also control operations related to usual functions of the mobile device. For example, when the controller 160 executes an application, it can control the operations and display corresponding data. The controller 160 receives input signals according to a variety of input modes that the touch-based input interface supports, and controls corresponding functions. In an exemplary embodiment of the invention, when an e-book function is executed, the controller 160 can control the real-time display of processed data corresponding to a user's touch-based input. The controller 160 can also control the data transmission/reception via wired or wireless communication.

The mobile device as shown in FIG. 1 can be applied to all types of devices, for example, a bar type, a folder type, a slide type, a swing type, a flip-flop type, etc. The mobile device according to the invention includes all information communication devices, multimedia devices, and their applications, which are operated according to communication protocols corresponding to a variety of communication systems. For example, the mobile device can be applied to mobile communication terminals, tablet personal computers, smartphones, Portable Multimedia Players (PMPs), digital broadcast players, Personal Digital Assistants (PDAs), mobile game players, net book computers, laptop computers, etc.

Figure 2:
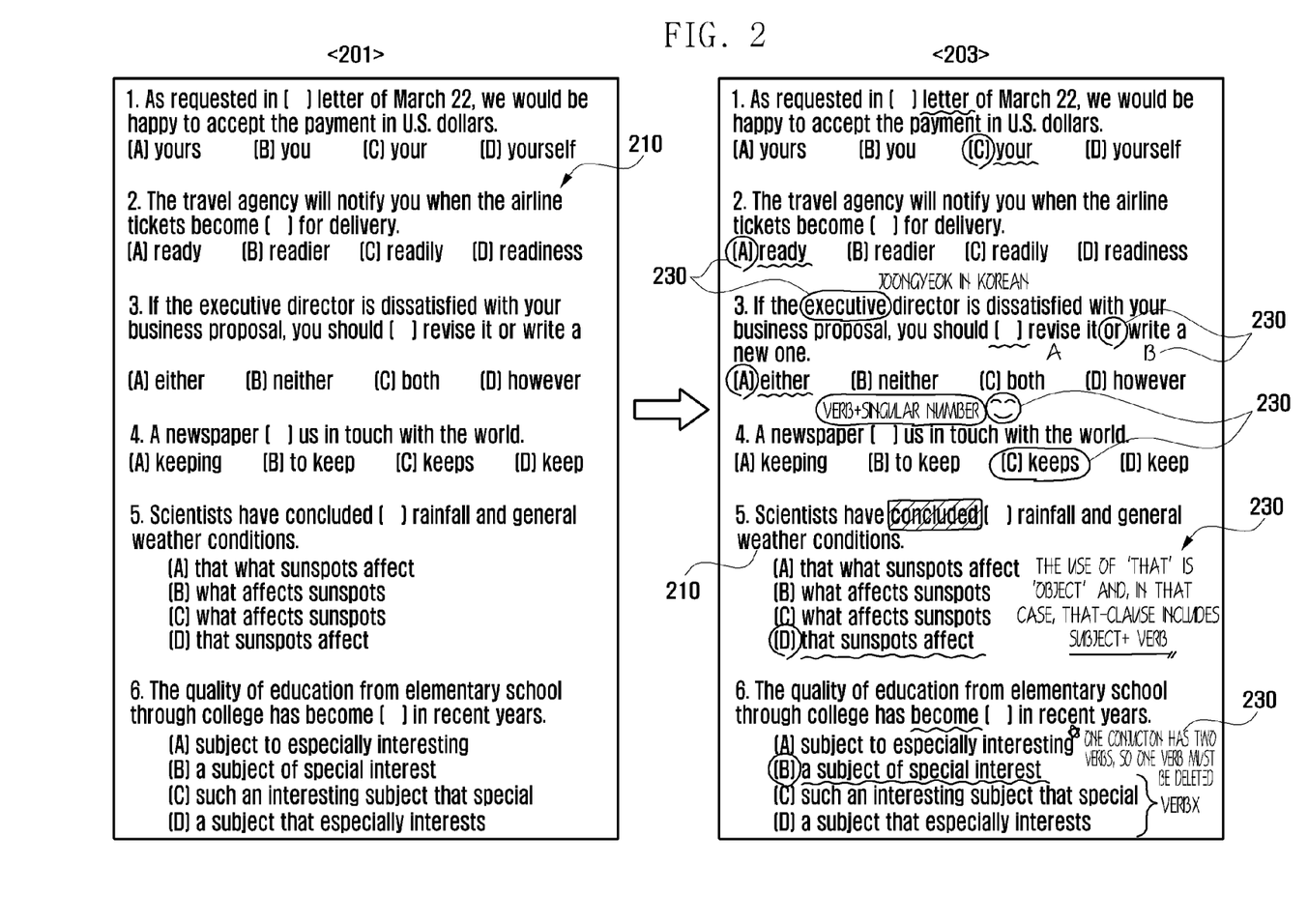
FIGS. 2 to 4 illustrate screens to describe the operations for supporting an e-book service in a mobile device, according to exemplary embodiments of the present invention.
Figure 3:
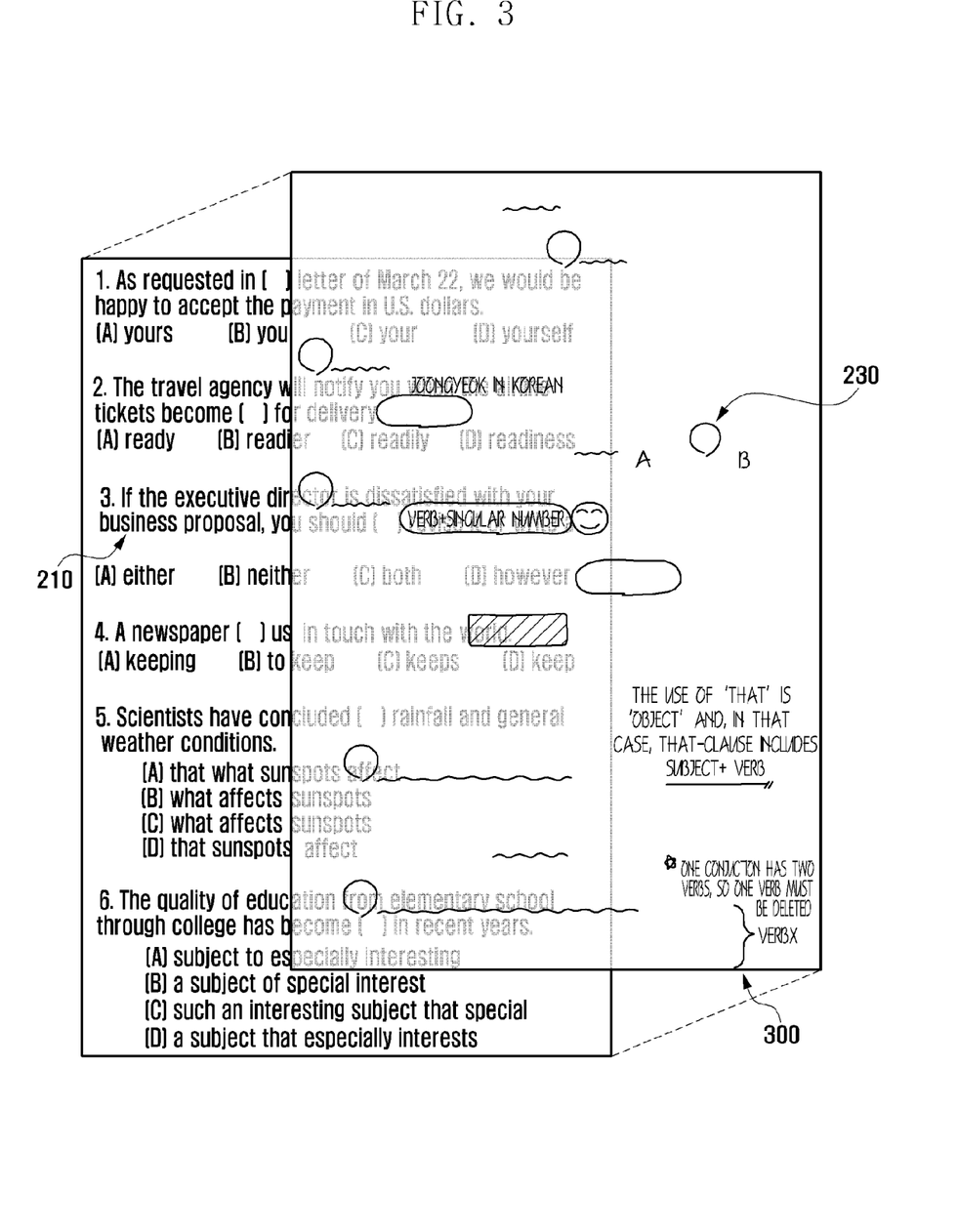
Figure 4:
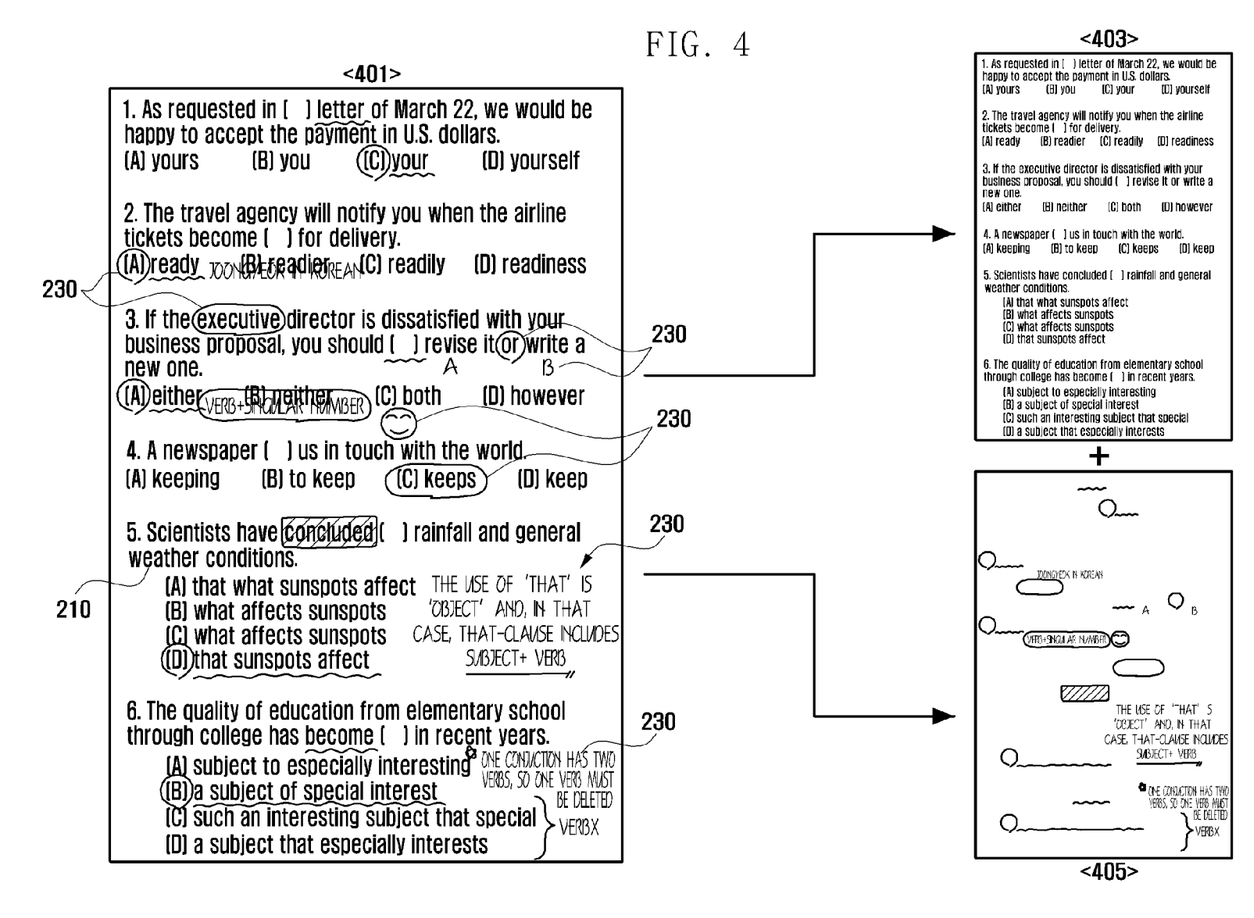

FIGS. 2 to 4 illustrate screens to describe the operations for supporting an e-book service in a mobile device, according to exemplary embodiments of the present invention.

Referring to diagram 201 of FIG. 2, the mobile device displays original contents 210 on the screen according to the execution of an e-book function.

Diagram 203 of FIG. 2 shows a state where processed data 230 corresponding to a user's input is displayed on the original contents 210. The screen shown in diagram 203 may be a case where the processed data 230, previously created and stored in the storage unit 130, is loaded and displayed on the original contents 210, or a case where processed data 230, previously transmitted from an external device and stored in the storage unit 130, is loaded and displayed on the original contents 210. The screen shown in diagram 203 may also be a case where, in a state where processed data previously created and stored in the storage unit 130 is loaded and displayed on the original contents 210, new processed data 230 is added onto the original contents 210 according to a user's input, or a case where, in a state where processed data previously transmitted from an external device and stored in the storage unit 130 is loaded and displayed on the original contents 210, new processed data 230 is added onto the original contents 210 according to a user's input. That is, diagram 203 shows a case where the processed data 230, currently received or loaded, overlays on the original contents 210.

As shown in diagram 203, the processed data 230 may be displayed, in various types, such as, text, image, icon, highlight by colors, lines, diagrams, etc., according to a user's input or a user's selection. The processed data 230 may also be displayed in file enclosure type, such as, video file, audio file, etc. The processed data 230 can be controlled, separating from the original contents 210. This is described referring to FIG. 3.

FIG. 3 shows a screen to describe the configuration relationship between the original contents 210 and the processed data 230 shown in FIG. 2. As shown in FIG. 3, the original contents 210 and the processed data 230 are separated from each other, or have independent structures. Therefore, although the user creates the processed data 230 on the original contents 210 on the screen shown in FIG. 2, the original contents 210 are not altered. That is, the processed data 230 corresponding to the user's input is created on the original contents 210, via a separate overlay window 300. Therefore, the mobile device can display only the original contents 210, or only the processed data 230, or processed contents where the processed data 230 overlays the original contents 210, according to a user's request. This is illustrated in FIG. 4.

Referring to diagram 401 of FIG. 4, the mobile device displays processed contents where processed data 230 overlays the original contents 210. Diagram 403 shows a case where only the original contents 210 of the processed contents are displayed according to a user's selection. Diagram 405 shows a case where only the processed data 230 of the processed contents is displayed according to a user's selection.

In an exemplary embodiment of the invention, the processed data 230 can be stored as an independent object, separating from the original contents 210. The stored, the processed data 230 can be transmitted to the other mobile device via wired/wireless communication, so that the mobile device users can share the processed data 230 with each other.

Figure 5:
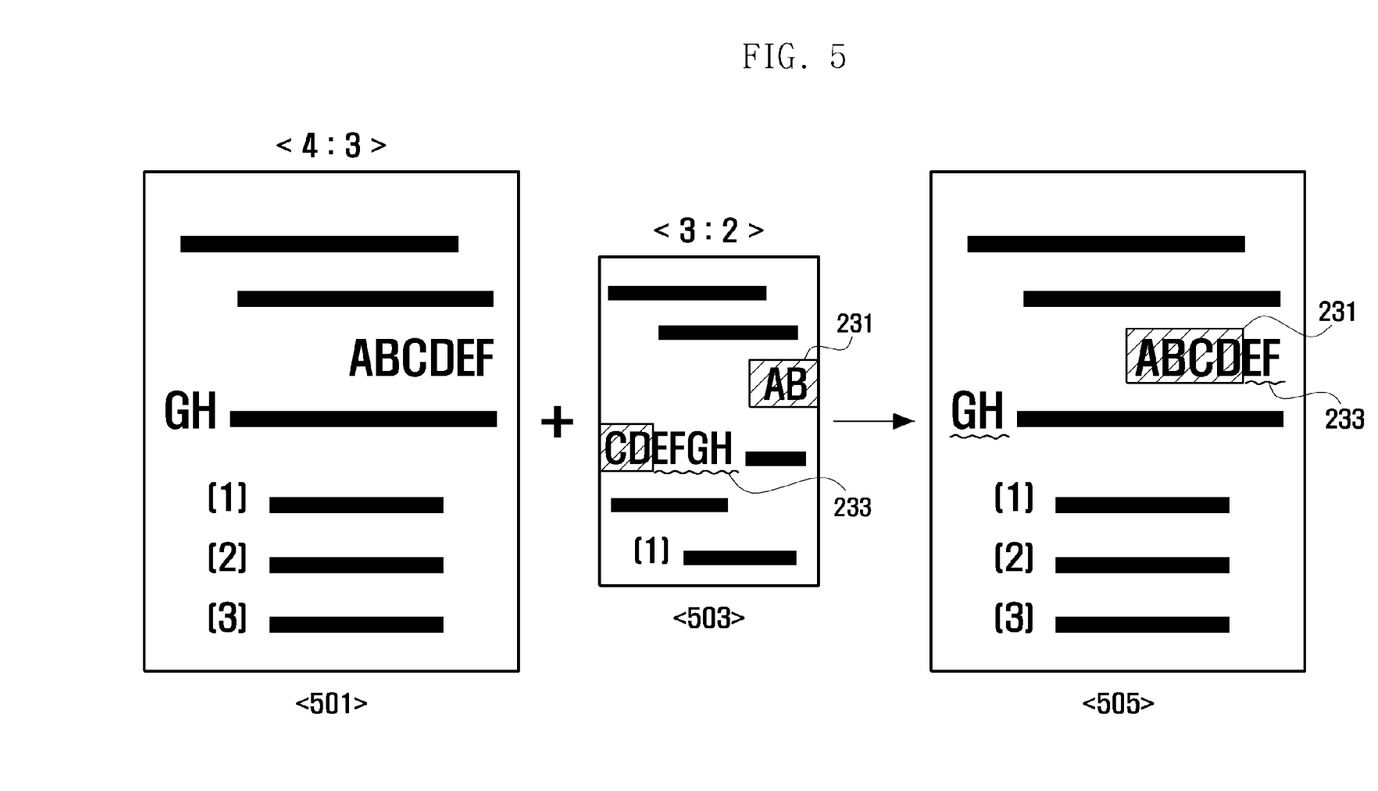
FIG. 5 illustrates screens to describe an operation for applying processed data to the original contents in a mobile device, according to an exemplary embodiment of the present invention.

FIG. 5 illustrates screens to describe an operation for applying processed data to the original contents in a mobile device, according to an exemplary embodiment of the present invention.

Diagram 501 shows a screen that displays original contents provided by the mobile device. Diagram 503 shows a screen that displays processed data that is transmitted from the other mobile device and stored. Diagram 505 shows a screen that displays processed contents created as the processed data overlays the original contents.

Referring to FIG. 5, it is assumed that the screen size of the mobile device differs from that of the other mobile device. It is also assumed that the original contents of the mobile device are the same type as those of the other mobile device that creates the processed data. However, they differently display the contents according to their supporting screen standards.

For example, as shown in diagram 501, the mobile device supporting the 4:3 aspect ratio displays the original contents. Diagram 501 shows a case where the mobile device stores processed data that is created according to the original contents provided by the other mobile device that supports the 3:2 aspect ratio.

It is assumed that the mobile device displays the original contents according to the execution of an e-book function as shown in diagram 501. The mobile device can load the processed data corresponding to the original contents from the storage unit, according to a user's request.

The mobile device compares meta information regarding the original contents with meta information regarding the stored, processed data, and determines the processed data corresponding to the original contents. When loading the determined, processed data, the mobile device determines the process information, for example, locations (coordinates) where processed data is displayed in the original contents, the process format, etc. After that, the mobile device detects part of the original contents, matching with the processed data, based on the process information, and overlays the processed data on the corresponding part of the original contents.

For example, as shown in FIG. 5, it is assumed that 'ABCD' in the original contents is designated as processed data via a block 231 and 'EFGH' is also designed as processed data via an underline 233. It is also assumed that the original contents are displayed in such a manner that the letters 'ABCDEF' are shown in one line and 'GH' are shown in the next line, as shown in diagram 501, according to the 4:3 aspect ratio of screen. It is also assumed that the processed data is displayed in such a manner that the letters 'AB' are shown in one line and 'CDEFGH' are shown in the next line, as shown in diagram 503, according to the 3:2 aspect ratio of screen. Although diagram 503 shows, for the sake of convenience, the letters 'ABCDEFG,' the mobile device does not display them in the real processed data. However, the mobile device where processed data is created may array and display the letters 'ABCDEFG' of the original contents as shown in diagram 503.

When data, processed with a standard, is displayed on original contents that has a different standard from that of the processed data, the mobile device identifies the format of the processed data (e.g., types of block and underline, colors, etc.) based on the process information, and also start and end locations on the original contents where the processed data will be displayed. For example, the mobile device identifies the processed data designated by the block 231 and the underline 233, and the locations of the processed data designated by the block 231 and the underline 233. After that, the mobile device tracks locations on the original contents, corresponding to the locations of the processed data, and overlays the processed data on the tracked locations of the original contents.

For example, when the start and end locations of the processed data designated by the block 231 are the coordinates (locations) of the letters 'A' and 'D' respectively, the mobile device tracks the coordinates (locations) of the letter 'A' and 'D' in the original contents, and overlays the processed data designated by the block 231 on the tracked coordinates (locations) as shown in diagram 505.

Likewise, when the start and end locations of the processed data designated by the underline 233 are the coordinates (locations) of the letters 'E' and 'H' respectively, the mobile device may track the coordinates (locations) of the letters 'E' and 'H' in the original contents, and overlay the processed data designated by the underline 233 on the tracked coordinates (locations) as shown in diagram 505.

Although it is not shown in the drawings, the mobile device may also display processed data, in real time, according to the alteration between the landscape and portrait modes. It will be noted that, when the original contents are smaller than the processed data, opposite to the exemplary embodiment shown in FIG. 5, the mobile device can also perform the display operation as the embodiment of FIG. 5.

Figure 6:
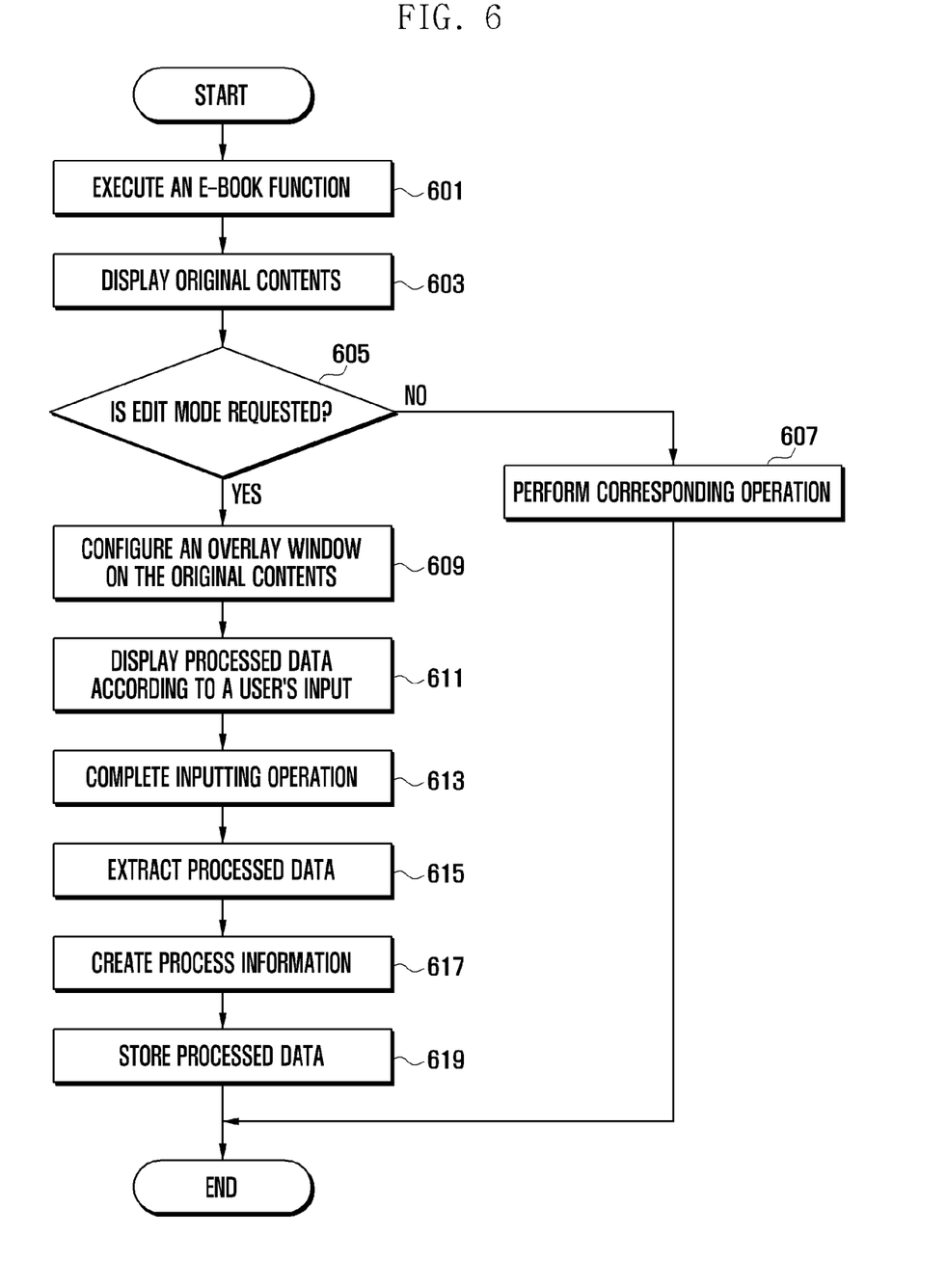
FIG. 6 illustrates a flowchart that describes a method for creating processed data in a mobile device, according to an exemplary embodiment of the present invention.

FIG. 6 illustrates a flowchart that describes a method for creating processed data in a mobile device, according to an exemplary embodiment of the present invention.

Referring to FIG. 6, the controller 160 executes an e-book function according to a user's request in step 601, and displays original contents corresponding to the user's selection in step 603.

The controller 160 determines whether an edit mode is requested in step 605. The edit mode refers to a mode where an overlay window is configured on the original contents to receive processed data. The edit mode can be executed by operating a button installed on the mobile device or by touching a touch-based interface (e.g., a touch screen).

When the controller 160 determines that an edit mode is not requested at step 605, it performs a corresponding operation in step 607. For example, the controller 160 scrolls the original contents according to a user's input or loads and displays new original contents.

On the contrary, when the controller 160 determines that an edit mode is requested at step 605, it configures an overlay window on the original contents in step 609. For example, as shown in FIG. 3, the controller 160 may display a separate overlay window 300 on the original contents. The overlay window 300 may be configured as an internal component, so that the user recognizes the original contents without any alteration. Alternatively, the controller 160 can configure the overlay window 300 so that the user can easily recognize whether the edit mode is executed, for example, by displaying in different colors.

The controller 160 displays processed data corresponding to a user's input in step 611. For example, the controller 160 creates and displays processed data on a location of the original contents to which a user's input is applied, or loads and displays processed data corresponding to a user's selection.

The controller 160 senses a request for the completion of inputting the processed data in step 613, and extracts the processed data that has been input to the original contents at the previous step in step 615. For example, the controller 160 can extract at least one piece of the processed data, created via user's inputs, such as text, images, icons, highlights by colors, lines, various types of diagrams, etc.

The controller 160 creates process information regarding the extracted processed data in step 617. For example, the controller 160 parses the format of the processed data, locations (coordinates) where the processed data matches the original contents, fonts (e.g., size, types, etc.), etc., and creates process information based on the parsed information.

The controller 160 stores the processed data regarding the original contents, based on the created process information in step 619. For example, the controller 160 stores the processed data, the created process information, and the meta information regarding the original contents corresponding to the processed data. The controller 160 can store the process information as an independent object, separated from the original contents.

Figure 7:
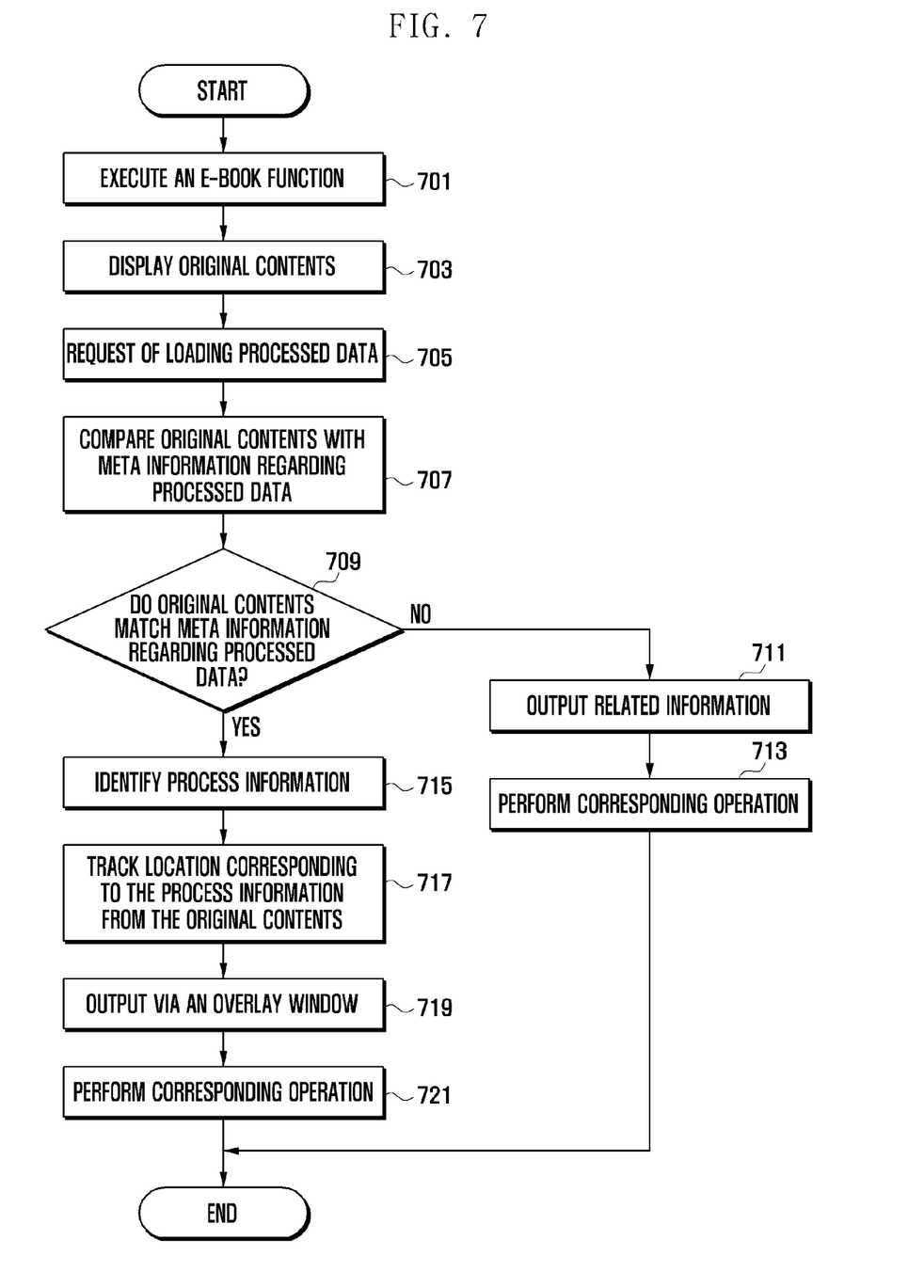
FIG. 7 illustrates a flowchart that describes a method for providing processed data corresponding to the original contents in a mobile device, according to an exemplary embodiment of the present invention.

FIG. 7 illustrates a flowchart that describes a method for providing processed data corresponding to the original contents in a mobile device, according to an exemplary embodiment of the present invention.

Referring to FIG. 7, the controller 160 executes an e-book function according to a user's request in step 701, and displays original contents corresponding to the user's selection in step 703.

The controller 160 senses a request to load processed data in step 705. For example, in order to request processed data, the user can operate a button installed on the mobile device or by touching a touch-based interface (e.g., a touch screen).

The controller 160 compares the meta information regarding the original contents with the meta information regarding stored processed data in step 707. For example, when requesting to load processed data, the controller 160 searches for stored processed data, and compares the meta information regarding the searched processed data with the meta information regarding the original contents. After that, the controller 160 determines whether there is processed data whose meta information matches the meta information regarding the original contents in step 709. That is, the controller 160 can search for processed data from among stored, processed data, whose meta information matches that of the original contents.

When the controller 160 determines that there is no processed data whose meta information matches that of the original contents at step 709, it outputs the related information in step 711, and performs a corresponding operation in step 713. For example, the controller 160 displays a pop-up message stating that there is no processed data matching the original contents, and performs a corresponding operation according to the user's selection with respect to the pop-up message. Alternatively, the controller 160 may control the display of a pop-up message and determine whether new processed data is created.

On the contrary, when the controller 160 determines that there is processed data of which the meta information matches that of the original contents at step 709, it identifies the process information regarding the processed data in step 715. For example, the controller 160 can identify the process formats, the locations (or coordinates) where the processed data is displayed on the original contents, etc.

After that, the controller 160 tracks the locations corresponding to the process information in the original contents in step 717, and displays the processed data corresponding to the process information on the original contents via an overlay window in step 719.

After displaying the processed data on the original contents at step 719, the controller 160 performs a corresponding operation according to a user's request in step 721. For example, while the controller 160 maintains displaying the processed data, it receives and stores newly added processed data according to a user's input. In order to share processed data with the other mobile devices, the controller 160 can also control the transmission, to the external system, of the loaded, processed data or new processed data created by adding processed data to the processed data, according to a user's selection. In exemplary embodiments of the invention, the processed data sharing method can be performed via created, processed data, as described above, or via part of processed data, i.e., object, that will be describe as follows, referring to FIGS. 8 and 9.

Figure 8:
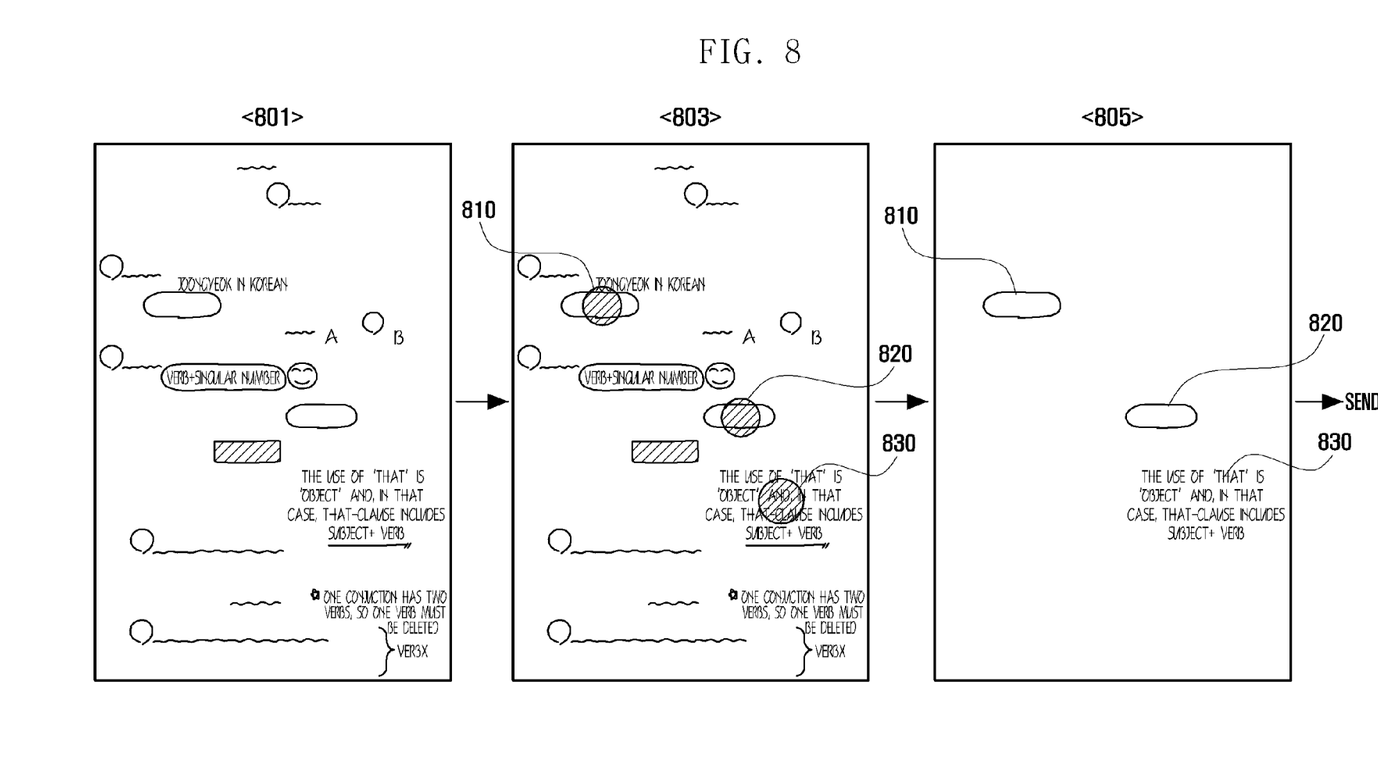
FIGS. 8 and 9 illustrate screens to describe operations of sharing processed data that a user defined in the mobile device with the other mobile devices, according to an exemplary embodiment of the present invention.
Figure 9:
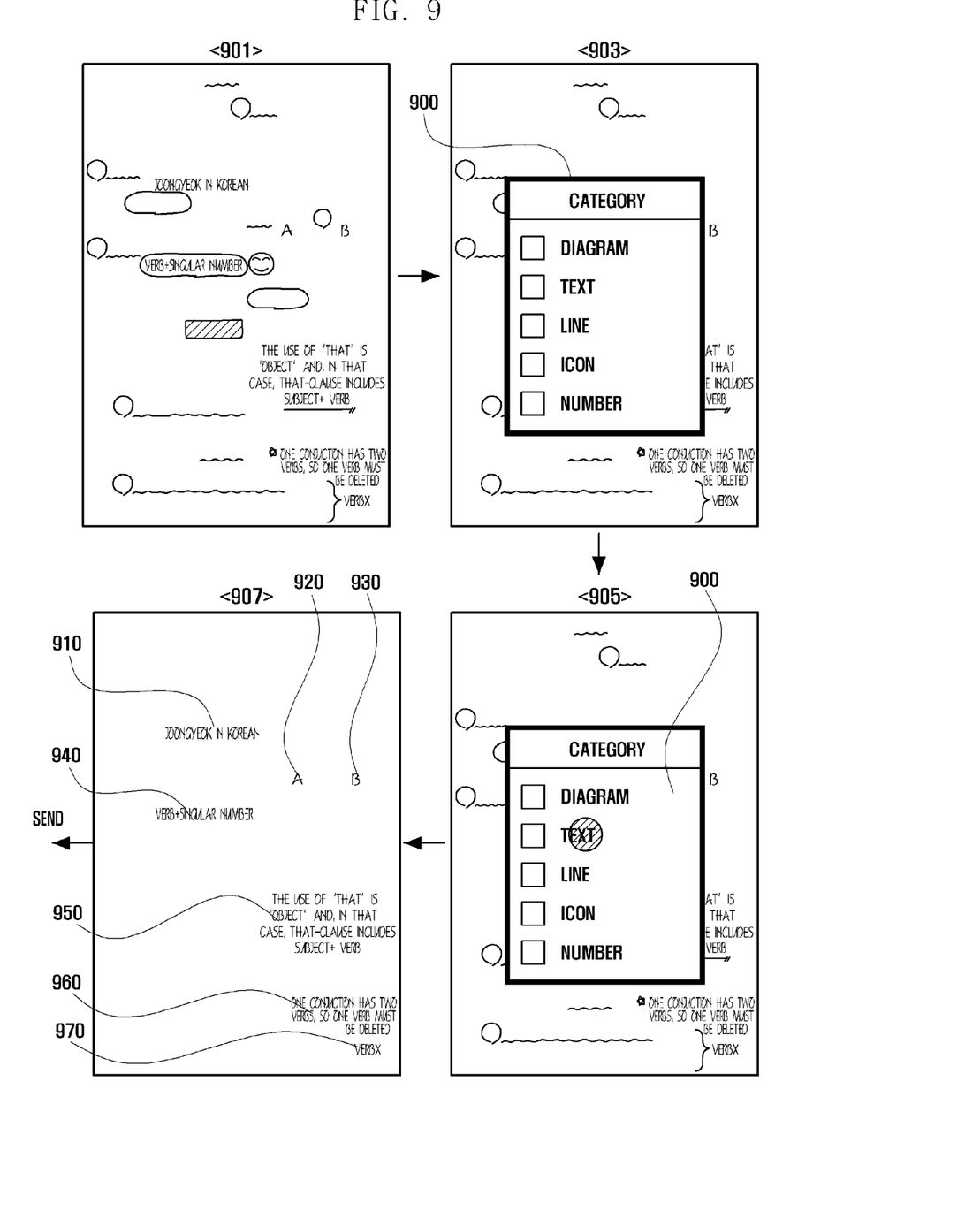

FIGS. 8 and 9 illustrate screens to describe operations of sharing processed data that a user defined in the mobile device with the other mobile devices, according to an exemplary embodiment of the present invention. FIG. 8 shows screens to describe a method where part of the processed data (i.e., object) created from original contents is designated according to a user's selection and shared with the other mobile device. FIG. 9 shows screens to describe a method where processed data is created from original contents, and part of the processed data (i.e., object) is extracted according to a pre-defined category and shared with the other mobile device.

Referring to diagram 801 of FIG. 8, it is assumed that the mobile device displays processed data comprised of a number of objects according to a user's definition. The processed data may be displayed alone as shown in FIG. 8 or overlaid on the original contents as shown in the drawings before FIG. 8.

In a state where the mobile device displays the screen as shown in diagram 801, it can transmit, to the other mobile device, processed data comprised of at least one from among a number of objects, which is called selected processed data. For example, as shown in diagram 803, the user can select and designate at least one of a number of objects configuring the processed data, for example, objects 810, 820, and 830. In an embodiment of the invention, objects can be selected by a single selection gesture or multiple selection gestures, in a touch-based mode.

The user can apply an interaction to the mobile device to store or transmit the selected objects 810, 820 and 830 as shown in diagram 803. The interaction may be an interaction to operate a menu to transmit processed data or a touch-based input interaction that is pre-defined to transmit processed data.

When the controller 160 detects an interaction to transmit processed data in a state where the objects 810, 820 and 830 are selected as shown in diagram 803, it displays only the objects 810, 820 and 830 so that the user can recognize whether he/she has correctly selected them as shown in diagram 805. When the controller 160 displays the objects 810, 820 and 830 selected by the user, it can only display the selected objects 810, 820 and 830, with removal of the remaining objects configuring the processed data. Alternatively, the controller 160 can highlight only the selected objects 810, 820 and 830, with dimming of the remaining objects configuring the processed data.

During the display process as shown in diagram 803, the user can alter his/her selection. This process may be omitted. In that case, a transmission process is performed immediately after the display process. When the controller 160 detects that the user has performed his/her selection, it can store only the selected objects 810, 820 and 830 as separate processed data. The controller 160 can store the processed data via the user's input file or via its default creating file name.

The controller 160 can transmit the processed data grouping the selected objects 810, 820 and 830 to the other mobile device, via wired/wireless communication according to a user's selection. In an exemplary embodiment of the invention, the user can manage and share only part of objects from among the created processed data, as a separate processed data group.

As shown in diagram 901 of FIG. 9, it is assumed that the mobile device displays processed data comprised of a number of objects according to a user's definition. The processed data may be displayed alone as shown in FIG. 9 or overlaid on the original contents as shown in the drawings before FIG. 8.

In a state where the mobile device displays the screen as shown in diagram 901, it can transmit, to the other mobile device, a category comprised of only corresponding objects from a number of objects, which is called selected processed data. The category refers to groups of objects configuring processed data. For example, as shown in diagram 901, a category refers to a group of objects such as lines, text, icons, diagrams, etc. The user can select objects from among a number of objects configuring processed data, as a category of objects, and share it with the other mobile device users.

For example, the user can apply an interaction to the mobile device to call a menu for designating a category (hereinafter referred to as a category menu). The interaction may be an interaction to operate a menu to call a category menu or a touch-based input interaction that is pre-defined to call a category menu.

When the controller 160 senses an interaction for calling a category menu in a state where the mobile device shows a screen as shown in diagram 901, it displays a category menu for selecting categories via a pop-up window 900, as shown in diagram 903. The user can apply an interaction to select an item (e.g., text) in the category menu as shown in diagram 905.

When sensing the interaction for selecting a category as shown in diagram 905, the controller 160 extracts at least one object corresponding to the selected category from the processed data. After that, as shown in diagram 907, the controller 160 displays at least one extracted object (e.g., objects 910, 920, 930, 940, 950, 960, and 970), so that the user can recognize whether he/she has correctly selected them. For example, as shown in diagram 905, when the user selects a category 'text,' the controller 160 extracts objects configured in text from among the objects configuring the processed data, and displays the extracted text objects 910, 920, 930, 940, 950, 960, and 970.

During the display process as shown in diagram 907, the user can alter his/her selection or select a new category. When the controller 160 displays the objects 910, 920, 930, 940, 950, 960, and 970 corresponding to the selected category, it can only display the selected objects 910, 920, 930, 940, 950, 960, and 970, with removal of the remaining objects configuring the processed data. Alternatively, the controller 160 can highlight only the objects 910 and 920, with dimming of the remaining objects configuring the processed data.

The controller 160 can store the processed data grouping a category of objects 910, 920, 930, 940, 950, 960, and 970 (e.g., a text category) or transmit them to the other mobile device, via wired/wireless communication according to a user's selection. In an exemplary embodiment of the invention, the user can manage and share only part of objects from among the created processed data, as a separate processed data group.

As described above, an exemplary method and apparatus according to the invention can enhance the quality of an e-book service supported by a mobile device, by adding new functions to the e-book service. An exemplary method and apparatus allows users to creatively produce data in the original e-book contents (short for, original contents) according to an e-book service and to independently use the processed data. That is, an exemplary method and apparatus can allow users to use his/her creatively produced individual e-book contents (processed data), regardless of time and place, without violating the copyright of the original contents. An exemplary method and apparatus can also allow a user to share his/her created individual e-book contents with the other mobile device users via wireless or wired communication. An exemplary method and apparatus can add newly processed data to previously processed individual e-book contents, thereby producing a variety of individual e-book contents from the one original e-book content.

When an exemplary method and apparatus processes teaching materials as e-book contents, it can input processed data such as notes, multimedia, etc. in the materials. Examples of the notes are marks for representing the degree of importance by users, problem solutions, etc. Examples of the multimedia are videos showing the problem solutions, images, sound sources, etc. Therefore, the method and apparatus can allow all users who possess the original e-book contents corresponding to teaching materials to share individually or integrally processed data each other, thereby increasing the learning efficiency.

An exemplary method and apparatus according to the invention can be applied to various types of electronic devices that can support an e-book function. An exemplary method and apparatus can implement an optimal environment in mobile devices where without users can create individual e-book contents from original e-book contents, without altering the original e-book contents, thereby enhancing the use convenience of mobile devices.

As described above, the e-book service providing method according to exemplary embodiments of the invention can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the invention or may be software well-known to the ordinary person skilled in the art.

The computer-readable recoding media includes hardware systems for storing and conducting program commands. Examples of the hardware systems are magnetic media such as a hard disk, floppy disk, a magnetic tape, optical media such as CD-ROM and DVD, Magneto-Optical Media, such as floptical disk, ROM, RAM, flash memory, etc. The program commands include assembly language or machine code complied by a complier and a higher level language interpreted by an interpreter. The hardware systems may be implemented with at least one software module to comply with the invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing an electronic book (e-book) service in a mobile device, the method comprising:
    displaying original contents;
    overlaying and displaying processed data according to a user's input on the original contents;
    mapping the processed data to the original contents;
    independently storing the processed data according to a user's selection
    extracting a category of objects from objects configuring the processed data according to a user's selection; and
    displaying processed data configuring at least one group of extracted objects,
    wherein the processed data comprises process information corresponding to the processed data, and meta information for tracking the original contents.

2. The method of claim 1, wherein the overlaying and displaying of the processed data comprises:
    configuring an overlay window in response to an edit mode request; and
    receiving the processed data via the overlay window.

3. The method of claim 2, wherein the independently storing of the processed data according to the user's selection comprises:
    extracting the processed data overlaid on the original contents;
    creating process information corresponding to the extracted processed data; and
    storing the process information and the meta information regarding the original contents.

4. The method of claim 3, wherein the creating of the process information comprises:
    parsing a format of the processed data, a location where the processed data matches the original contents, and a font type; and
    creating the process information based on the parsed information.

5. The method of claim 2, further comprising:
    transmitting the stored processed data to another mobile device via wired/wireless communication.

6. The method of claim 5, wherein the transmitting of the stored processed data comprises:
    transmitting, to the other mobile device, processed data configuring at least one group of objects that are selected, by a user, from among objects configuring the processed data.

7. The method of claim 5, wherein the transmitting of the stored processed data comprises:
    transmitting, to the other mobile device, the processed data configuring at least one group of extracted objects.

8. The method of claim 1, wherein the processed data comprises at least one of text, images, icons, highlights by colors, lines, and diagrams.

9. A method for providing an electronic book (e-book) service in a mobile device, the method comprising:
    displaying original contents;
    loading processed data corresponding to the original contents and overlaying and displaying the processed data on the original contents;
    adding processed data input by a user to the processed data;
    mapping processed data including additional processed data to the original contents;
    independently storing the processed data;
    extracting a category of objects from objects configuring the processed data according to a user's selection; and
    displaying processed data configuring at least one group of extracted objects,
    wherein the processed data comprises process information corresponding to the processed data, and meta information for tracking the original contents.

10. The method of claim 9, wherein the loading of the processed data and the overlaying and displaying of the processed data comprise:
    detecting a request for loading processed data;
    comparing meta information regarding the original contents with meta information regarding stored processed data; and
    loading processed data whose meta information matches the meta information regarding the original contents.

11. The method of claim 10, wherein the loading of the processed data comprises:
    identifying process information regarding the processed data;
    tracking a location corresponding to the process information from the original contents; and
    displaying processed data corresponding to the process information on the tracked location via an overlay window.

12. A mobile device supporting an electronic book (e-book) service, the device comprising:
    a display unit configured:
        to display original contents according to the e-book service, and
        to overlay and display processed data corresponding to a user's input or selection on the original contents;
    a storage unit configured to store the original contents for the e-book service, processed data created corresponding to the original contents, and processed data transmitted from an external system; and
    a controller configured:
        to configure, when detecting an edit mode request during the display of the original contents, an overlay window,
        to control the display unit to display the processed data on the original contents via the overlay window, and
        to control the storage unit to store the processed data as an independent object with respect to the original contents,
    wherein the processed data comprises process information corresponding to the processed data, and meta information for tracking the original contents,
    wherein the controller is further configured to extract a category of objects from objects configuring the processed data according to a user's selection, and to control the display unit to display processed data configuring at least one group of extracted objects.

13. The mobile device of claim 12, wherein the storage unit comprises:
    a contents storage unit configured to store the original contents; and
    a processed data storage unit configured to store processed data created corresponding to a user's input or processed data transmitted from an external mobile device.

14. The mobile device of claim 13, wherein the controller parses a format of the processed data, a location where the processed data matches the original contents, and a font type, and creates the process information based on the parsed information.

15. The mobile device of claim 13, wherein, when displaying the original contents and loading the processed data, the controller compares meta information regarding the original contents with meta information regarding processed data stored in the processed data storage unit and loads processed data whose meta information matches the meta information regarding the original contents.

16. The mobile device of claim 15, wherein the controller is configured to process information regarding the processed data, to track a location corresponding to the process information from the original contents, and to display processed data corresponding to the process information on the tracked location via an overlay window.

17. The mobile device of claim 15,
wherein the controller transmits the processed data,
wherein the processed data configures at least one group of objects that are selected, by a user, from among objects configuring the processed data, and
wherein the processed data configures at least one group of objects that are extracted, according to a category corresponding to a user's selection, from among objects configuring the processed data.

18. The mobile device of claim 12, wherein the processed data comprises at least one of text, images, icons, highlights by colors, lines, and diagrams.

* * * * *